United States Patent [19]

Peck et al.

[11] Patent Number: 4,648,905
[45] Date of Patent: Mar. 10, 1987

[54] AQUEOUS PRINTING INK

[75] Inventors: Michael C. Peck, Stone Mountain; Dennis M. Jacobi, Savannah, both of Ga.

[73] Assignee: Union Camp Corporation, Wayne, N.J.

[21] Appl. No.: 706,102

[22] Filed: Feb. 27, 1985

Related U.S. Application Data

[63] Continuation-in-part of Ser. No. 462,705, Jan. 31, 1983, abandoned.

[51] Int. Cl.$^4$ .................... C09D 11/04; C09D 11/08; C09D 11/10
[52] U.S. Cl. ........................................ 106/24; 106/27; 106/29; 106/30; 524/156; 524/157; 524/270; 524/502; 524/745; 524/797; 524/798
[58] Field of Search ........................ 106/23, 24, 25, 27, 106/28, 29, 30; 524/156, 157, 270, 502, 745, 797, 798

[56] References Cited

U.S. PATENT DOCUMENTS 2,771,373 11/1956 Chambers et al. .................... 106/24
4,385,901 5/1983 Podder ................................... 8/527

*Primary Examiner*—Amelia B. Yarbrough
*Attorney, Agent, or Firm*—Kane, Dalsimer, Kane, Sullivan and Kurucz

[57] ABSTRACT

Aqueous printing ink vehicle and ink compositions are disclosed, which are based on sulfated or sulfonated organic compound binders or non-ionic pigment binders.

20 Claims, No Drawings

AQUEOUS PRINTING INK

CROSS-REFERENCE TO RELATED APPLICATION

This application is a continuation-in-part of my pending application Ser. No. 462,705 filed on Jan. 31, 1983, now abandoned.

BACKGROUND OF THE INVENTION

1. Field of the Invention

The invention relates to printing ink and more particularly to an aqueous printing ink vehicle and ink using a sulfated fatty acid component as a pigment binder.

2. Brief Description of the Prior Art

Conventional, commercially available printing inks, particularly useful for newsprinting, are generally made up of petroleum oils in which a pigment (preferably carbon black) is suspended. When applied to a paper substrate the oil separates from the pigment and is absorbed into the paper substrate. The pigment is left deposited on the paper surface, but "undried". In this "undried" state, offsetting may occur, i.e.; the ink is readily removed by rubbing the undried deposit.

There are a number of other disadvantages associated with the use of oil based printing inks, including "strike through", the phenomena caused by penetration of the oil component through the paper substrate so as to stain the reverse side. Many of these prior art problems associated with the use of oil based printing inks have been solved by the use of water-based printing inks; see for example U.S. Pat. No. 4,310,356.

The present invention is of water-based printing ink that is useful as a newsprint ink and also for printing on any porous surface such as cellulosic bags, boxes and the like. The ink of the invention is unique in that it includes as an active ingredient, a water-dispersible, sulfated organic binder based on a renewable resource and a co-binder useful for viscosity control. The inks of the invention are advantageous in that they are relatively non-polluting, may be applied by the flexographic technique (avoiding the energy inefficient letterpress technique), avoid "strike-through" and are rubresistant because they "dry" or bind on the substrate surface. The quality of printing achievable is high.

SUMMARY OF THE INVENTION

The invention comprises a printing ink vehicle, which comprises;
  a. a sulfated or sulfonated organic water-dispersible pigment binder;
  b. a viscosity adjusting agent;
  c. a defoamer;
  d. a pH adjusting agent; and
  e. water;
wherein the binder comprises 50 to 100 percent of the total vehicle solids, said vehicle having a viscosity within the range of from about 150 to about 25,000, preferably 1,000 to 8,000 centipoise (Brookfield viscosity at 25° C.) and a pH within the range of from about 5 to about 12, preferably 8.0 to 9.5.

The invention also comprises printing inks made with the ink vehicle of the invention. The printing inks of this invention are prepared by dispersing a suitable pigment in the aforementioned vehicle by methods well known in the art, said ink having a viscosity range of from about 15 to about 80 seconds on a number 2 Zahn cup.

The printing inks of this invention are particularly useful in printing newspapers, kraft paper, liner board and similar absorbent substrates.

DETAILED DESCRIPTION OF THE PREFERRED EMBODIMENTS OF THE INVENTION

The invention revolves around the discovery that sulfated or sulfonated organic compounds are excellent binder components for aqueous printing ink compositions.

A wide variety of sulfated or sulfonated organic compounds may be employed as an active ingredient (binder) in the vehicles and the inks of the invention. Representative of such binders are:

| | |
|---|---|
| Sulfated Castor Oils | Alkylaryl Sulfonates |
| Alcohol Ether Sulfates | Naphthalene Sulfonates |
| Fatty Ester Sulfates | Sulfo Succinates |
| Ethoxylated Alkyl Phenol Sulfates | Ligno Sulfonates |
| Alkyl Sulfates | Olefin Sulfonates |
| Sulfated Fatty Amides | Fatty Amide Sulfonates |
| Aromatic Sulfonates | Ethoxylated Alkyl Phenol Sulfonates |
| Sulfated oleic acid alcohol ether sulfate | | and the like.

Preferred as the sulfated or sulfonated organic compound employed in the invention are the sulfated or sulfonated fatty acids. The term "fatty acids" as used herein means the large group of aliphatic, monocarboxylic acids including the saturated acids of the acetic acid series $C_nH_{2n+1}COOH$, both normal and branched-chain and the corresponding unsaturated acids. A complete definition and examples of fatty acids may be found in the Kirk-Othmer Encyclopedia of Chemistry, Second Edition, Vol. 8, page 811.

The sulfated or sulfonated fatty acids employed in the present invention may be prepared by the following schemes:

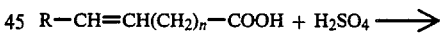

$$R-CH=CH(CH_2)_n-COOH + H_2SO_4 \longrightarrow$$

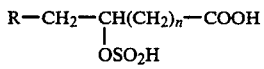

Sulfonation: (Fatty Acid + Sulfur Trioxide)

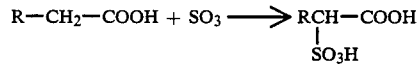

Wherein R represents the aliphatic residue of the fatty acid, after removal of the $-CH=CH-(CH_2)_n COOH$ or $-CH_2-COOH$ moiety.

Particularly preferred as the binder component of the printing ink composition of the present invention are the sulfated or sulfonated tall oil fatty acids. Crude tall oil generally contains from about 54–36 percent fatty acids in admixture with 38 to 58 percent rosin acids and 5 to 15 percent unsaponifiables. The sulfated or sulfonated crude oil mixtures may be used in the vehicle and the inks of the invention. Advantageously however, refined tall oils are used, containing a minimum of at least 90 percent fatty acids to prepare the sulfate or sulfonate used in the composition of the invention. These sulfated or sulfonated fatty acids generally contain from 3% to 10% hydrolyzable sulfate or sulfonate as sulfur and preferably 4% to 7%. On a 100% nonvolatile basis, sulfated and sulfonated binders are advantageously used in a proportion of from 50 to 100% and preferably 80-90% in the ink vehicle.

Particularly preferred as a refined tall oil fatty acid (TOFA) to prepare the sulfate or sulfonate used in the compositions of the invention is Unitol DSR (Union Camp Corporation) which has the following typical composition.

|  | Weight Percent |
| --- | --- |
| palmitic and stearic acids | 4.6 |
| oleic acid | 40.3 |
| linoleic acid | 34.5 |
| miscellaneous acids | 11.5 |
| rosin acids | 3.0–8.0 |
| unsaponifiables | 3.0 |

The following preparation describes a process for making a preferred sulfated tall oil fatty acid used in the compositions of this invention.

PREPARATION

Twelve hundred sixty pounds of Unitol DSR (Union Camp Corporation) was charged to a 500 gallon lead lined reactor equipped with three sets of angled paddles, fume removal system, and lead heating/cooling coils. Agitation was begun and the Unitol DSR precooled to 10° C. Three hundred seventy-eight pounds of 98% sulfuric acid was added over a two-hour period under full reactor cooling (glycol) and the temperature rose to 23° C. The reaction mix was cooled to 10° C. for neutralization. Twelve hundred sixty pounds of 17% sodium hydroxide was added over a one-half hour period. This gave a pH=5.1 with the reaction temperature climbing to 42° C. Fifty pounds of sodium sulfate and 100 pounds of isopropyl alcohol were added to facilitate oil-water phase separation. The mixture was left to split for eight hours. The oil phase was collected as product with the following:

| pH = | 5.1 |
| --- | --- |
| % solids = | 66.0 |
| % hydrolyzable sulfate = | 5.3 |

Examples of other commercially available sulfated tall oil fatty acids are Actrasol SP (Southland Corp.) and Chemos L-22 (Chemos Chemical Corp.).

The preferred sulfated fatty acids employed as binders in the vehicle and ink compositions of the invention generally contain from three to ten percent hydrolyzable sulfate and preferably five to seven percent.

The sulfated fatty acid binders are advantageously used in a major proportion of from 50 to 100 percent and preferably 50 to 70 percent of the total ink vehicle composition.

In addition to the sulfated or sulfonated fatty acid binder component, the compositions of the invention also contain a minor proportion of a viscosity adjusting agent, which is also functionally a co-binder. While protein extracted from soybeans is preferred as a co-binder and viscosity adjusting modifier, numerous other natural and synthetic water dispersible polymeric substances can be used. Representative of these are:

| | |
| --- | --- |
| sodium alginate | poly(vinyl pyrrolidone) |
| hydroxy alkyl cellulose | poly(acrylic acid) resins |
| sodium carrageenan | poly(vinyl alcohol) |
| guar, agar, arabic gums | Ethylene-acrylic acid Copolymer |
| poly(alkylene oxides) | styrene/maleic anhydride resins |
| starches (dextrins) | Styrene/acrylic acid resins |
| alcohol soluble rosin-maleic resins | carboxymethyl cellulose |
| poly(acrylamide) | shellac |
| casein | methyl-vinyl ether maleic resins |
| | plant and animal protein | and the like. Preferred as the viscosity adjusting agent is protein extracted from soyabean, such as Ralston Purina Polymer 8000 (Ralston Purina Corporation).

The viscosity adjusting agent is used in a minor proportion adequate to obtain the desired viscosity of the composition of the invention. Typically, 1–10 percent by weight of the vehicle non-volatile portion is used.

Advantageously, a defoamer is an ingredient of the compositions of the invention. Any conventional defoamer may be employed, in a defoaming proportion. Defoamers are well known and many are commercially available such as WITCO 3056A (WITCO Chemical Co.).

The compositions of the invention advantageously have a pH of from 8.0 to 9.0. The desired pH may be obtained, when necessary, by adjustment with an acid or a base. In general, the compositions of the invention would tend to be acid without the addition of a strong base such as ammonium hydroxide to adjust to the desired pH.

The vehicle compositions of the invention are prepared by simple admixture of the ingredients therefore, employing conventional apparatus and techniques for mixing aqueous materials.

The following examples describe the manner and the process of making and using the invention and set forth the best mode contemplated by the inventors but are not to be construed as limiting. All parts are by weight unless otherwise stated.

EXAMPLE 1

A suitable vessel was charged with 70 parts by weight of a sulfated tall oil fatty acid (UNITOL H-66, supra., a sodium neutralized sulfated tall oil with a low rosin acid content) and 17.5 parts of water. To the charge there was added with stirring 5.0 parts of an amine dispersible soya protein (Polymer 8000; Ralston Purina Corporation). The mixture is heated to a temperature of circa 55° C. and with continued stirring there is added 7.0 parts of ammonium hydroxide. The temperature of the mixture is raised to circa 63° C. and stirring continued for about 30 minutes, after which there is added 0.5 parts of a defoamer (Witco 3056A). After stirring for an additional 10 minutes, the mixture is allowed to cool to room temperature, filtered through cheesecloth and stored for use in a printing ink.

EXAMPLE 2

Prepared in an analogous manner to Example 1, only the composition is altered. The reaction vessel is charged with 63.3 parts of sulfonated tall oil fatty acid (sulfonated UNITOL DSR; an ammonium neutralized sulfonated tall oil with low rosin acid content) and 24.9 parts of water to the charge. To the mixture was added with stirring 5.0 parts of an amine dispersible soya protein (Polymer 8000; Ralston Purina Corporation). The mixture is heated to a temperature of circa 55° C. and with continued stirring there is added 6.0 parts of ammonium hydroxide. The temperature of the mixture is raised to circa 63° C. and stirring continued for about 30 minutes, after which there is added 0.5 parts of a defoamer (Witco 3056A). After stirring for an additional 10 minutes, the mixture is allowed to cool to room temperature, filtered through cheesecloth and stored for use in a printing ink.

EXAMPLES 3-50

Vehicle is prepared as in Examples 1 and 2 but with a variable composition. Refer to Tables I-IV, below.

TABLE I

Vehicle Description (binder modifier)

| Example | Binder | Type | % N.V. | pH | Brookfield Viscosity @ 25° C., cps |
|---|---|---|---|---|---|
| 1 | UNITOL H-66 (Union Camp Corp.) | Sulfated TOFA | 50.1 | 8.5 | 3,80 |
| 2 | Sulfonated TOFA (Union Camp Corp.) | — | 50.8 | 8.4 | 1,200 |
| 3 | Sulfated TOFA 2/18% rosin acids (Union Camp Corp.) | | 50 | 9.1 | 2,800 |
| 4 | Chemos L-22 | Sulfated TOFA | 51.0 | 8.7 | 6,150 |
| 5 | Actrasol SP (Southland Corp.) | Sulfated TOFA | 49.9 | N/A | P-8000 incompatible |
| 6 | Actrasol SP-175K (Southland Corp.) | Sulfated TOFA | 50.0 | N/A | Gelled |
| 7 | Eureka 392 (Atlas) | Sulfated Vegetable Fatty Acid | 50.8 | 8.8 | 31,200 |
| 8 | Actrasol SRK-75 (Southland Corp.) | Sulfated Oleic Acid | 51.0 | 8.6 | 6,250 |
| 9 | Sul-Fon-Ate OA-5 (Chemex) | Sulfonated Oleic Acid | 54.0 | 8.4 | 3,100 |
| 10 | Actrasol SR-75 (Southland Corp.) | Sulfonated Oleic Acid | 50.0 | N/A | Gelled |
| 11 | Actrasol C-75 (Southland Corp.) | Sulfated Castor Oil | 49.5 | 9.0 | 1,000 |
| 12 | Emkapan K (EMKAY Chem.) | Sulfated Fatty Amide | 39.5 | 8.9 | 180 |
| 13 | Emkapan Jel B5 (EMKAY Chem.) | Fatty Amide Sulfonate (rigid gel of low solids) | | | |
| 14 | Atlas WA-108 | Sulfated Butyloleate | 50.5 | 8.6 | 500 |
| 15 | Witco 1247H | Alcohol Ether Sulfate (gelled on addition of water) | | | |
| 16 | Alipal CO-433 (GAF) | Ethoxylated Alkyl Phenol Sulfate | 26.5 | 8.8 | 8,500 |
| 17 | Triton X200 (Rohm & Haas) | Ethoxylated Alkyl Phenol Sulfonate | 28.0 | 9.2 | 20,000 (soft gel) |
| 18 | DuPont WAQE | Lauryl Alkyl Sulfate | 26.5 | 9.0 | 14, two phase |
| 19 | Siponate A-246 (Alcolac Inc.) | Olefin Sulfonate | 40.2 | 8.7 | Two phase separation |
| 20 | Polystep A-13 (Stepan Chemical) | Alkylaryl Sulfonate (gelled on addition of water) | | | |
| 21 | Conoco SXS | Aromatic Sulfonate | 26.5 | 9.1 | 173 |
| 22 | Aerosol OS (American Cyanamid) | Naphthalene Sulfonate | 50.0 | 8.7 | Separation |
| 23 | Trastan L5 (Southland Corp.) | Ligno Sulfonate | 50.0 | 8.9 | Gellatinous |
| 24 | Aerosol OT-B (American Cyanimid) | Sodium dioctyl sulfosuccinate | 50.0 | 8.8 | 69, separation |

Vehicle Composition (Experimental Values in Table IV)
Binder
Ralston Purina Polymer 8000 (viscosity adjuster)
NH₄OH Adjustment to pH 8.0-9.0
Witco 3056A defoamer
Water

TABLE II

Vehicle Description (viscosity adjuster modified)

| Example | Viscosity Adjuster | Type | % N.V. | pH | Brookfield Viscosity @ 25° C., cps |
|---|---|---|---|---|---|
| 2 | Polymer 8000 (Ralston Purina) | Soya Protein | 50.8 | 8.4 | 1,200 |
| 25 | SMA 1440 (ARCO) | Styrene-Maleic Resin | 51.6 | 9.0 | 370 |
| 26 | Joncryl 678 (S.C. Johnson) | Styrene-Acrylic Acid Resin | 50.4 | 8.5 | 2,100 |
| 27 | Acrysol G-110 (Rohm & Haas) | Poly (Acrylic Acid) | 53.5 | 8.2 | 25,000 |
| 28 | Sodium Alginate (KELCO) | — | 51.8 | 9.3 | 229 |
| 29 | NP-K30 (GAF) | Poly(Vinyl Pyrrolidone) | 52.5 | 8.6 | 816 |
| 30 | Carbowax 5000 (Union Carbide) | Polyethylene Glycol | 52.0 | 8.9 | 370 |
| 31 | Stradex 201 (National Starch) | Corn Dextrin | 52.2 | 9.0 | 322 |
| 32 | UNI-REZ 7019 (Union Camp Corp.) | Rosin Maleic Resin | 52.0 | 8.9 | 252 |
| 33 | PEG 400 (Union Carbide) | Polyethylene Glycol | 52.1 | 9.1 | 188 |
| 34 | Cyanamer A-370 (American Cyanamid) | Polyacrylamide | | | (formed two phases) |
| 35 | Shellac (Mantrose) | — | | | (formed two phases) |

TABLE II-continued

| | | Vehicle Description (viscosity adjuster modified) | | | Brookfield |
|---|---|---|---|---|---|
| Example | Viscosity Adjuster | Type | % N.V. | pH | Viscosity @ 25° C., cps |
| 36 | Vinol 350 (Air Products & Chemicals) | Polyvinyl Alcohol | | | (formed two phases) |
| 37 | Hercules CMC (TL) | Carboxymethyl Cellulose | | | (formed two phases) |
| 38 | Gum Arabic (TIC) | — | | | (formed two phases) |
| 39 | Gum Guar (TIC) | — | | | (formed two phases) |
| 40 | Nadex 152 (National Starch) | Starch | | | (formed two phases) |
| 41 | Ac-5120 (Allied Chemical) | Ethylene-Acrylic Acid Copolymer | | | (formed two phases) |
| 42 | Procote 200 LV (Ralston Purina) | Soya Protein | 51.2 | 9.2 | 694 |
| 43 | Procote 200 MW (Ralston Purina) | Soya Protein | 50.2 | 8.4 | 1,400 |
| 44 | Casein (Fisher) | Phosphoprotein | 50.7 | 8.3 | 1,200 |

Vehicle Composition (Experimental values in Table IV)
Sulfonated TOFA (binder)
Viscosity Adjuster
NH$_4$OH Adjustment to pH 8.0-9.5
Witco 3056A defoamer
Water

TABLE III

Vehicle Formulas

| Example | Weight % Binder | Weight % Viscosity Adjuster | Weight % Water | Weight % NH$_4$OH | Weight % Defoamer |
|---|---|---|---|---|---|
| 1 | 70.0 | 5.0 | 17.5 | 7.0 | 0.5 |
| 2 | 63.3 | 5.0 | 24.9 | 6.0 | 0.8 |
| 3 | 64.5 | 5.0 | 24.0 | 6.0 | 0.5 |
| 4 | 66.0 | 5.0 | 20.5 | 8.0 | 0.5 |
| 5 | 87.2 | 5.0 | 2.9 | 4.4 | 0.5 |
| 6 | 70.0 | 5.0 | 17.5 | 7.0 | 0.5 |
| 7 | 60.0 | 5.0 | 27.5 | 7.0 | 0.5 |
| 8 | 70.0 | 5.0 | 17.5 | 7.0 | 0.5 |
| 9 | 87.0 | 5.0 | 1.5 | 6.0 | 0.5 |
| 10 | 70.0 | 5.0 | 17.5 | 7.0 | 0.5 |
| 11 | 62.0 | 5.0 | 27.5 | 6.0 | 0.5 |
| 12 | 88.5 | 4.0 | 0 | 7.0 | 0.5 |
| 13 | — | — | — | — | — |
| 14 | 70 | 5.0 | 17.5 | 7.0 | 0.5 |
| 15 | (Gelled on addition of water.) | | | | 0.5 |
| 16 | 90 | 2.7 | 0 | 6.8 | 0.5 |
| 17 | 90 | 2.8 | 0 | 6.7 | 0.5 |
| 18 | 95 | 2.7 | 0 | 2.8 | 0.5 |
| 19 | 90.5 | 4.0 | 0 | 5.0 | 0.5 |
| 20 | (Gelled on addition of water.) | | | | |
| 21 | 60 | 2.7 | 30.8 | 6.0 | 0.5 |
| 22 | 45 | 5.0 | 42.5 | 7.0 | 0.5 |
| 23 | 47.4 | 5.0 | 40.1 | 7.0 | 0.5 |
| 24 | 45 | 5.0 | 42.5 | 7.0 | 0.5 |
| 25 | 70 | 5.0 | 17.5 | 7.0 | 0.5 |
| 26 | 42 | 20.0 | 30.5 | 7.0 | 0.5 |
| 27 | 70 | 23.0 | 0 | 7.0 | 0.5 |
| 28 | 70 | 5.0 | 17.5 | 7.0 | 0.5 |
| 29 | 70 | 5.0 | 17.5 | 7.0 | 0.5 |
| 30 | 70 | 5.0 | 17.5 | 7.0 | 0.5 |
| 31 | 70 | 5.0 | 17.5 | 7.0 | 0.5 |
| 32 | 70 | 5.0 | 17.5 | 7.0 | 0.5 |
| 33 | 70 | 5.0 | 17.5 | 7.0 | 0.5 |
| 34 | 70 | 5.0 | 17.5 | 7.0 | 0.5 |
| 35 | 70 | 5.0 | 17.5 | 7.0 | 0.5 |
| 36 | 70 | 5.0 | 17.5 | 7.0 | 0.5 |
| 37 | 70 | 5.0 | 17.5 | 7.0 | 0.5 |
| 38 | 70 | 5.0 | 17.5 | 7.0 | 0.5 |
| 39 | 70 | 5.0 | 17.5 | 7.0 | 0.5 |
| 40 | 70 | 5.0 | 17.5 | 7.0 | 0.5 |
| 41 | 70 | 5.0 | 17.5 | 7.0 | 0.5 |
| 42 | 70 | 5.0 | 17.5 | 7.0 | 0.5 |
| 43 | 65 | 5.0 | 23.5 | 6.0 | 0.5 |
| 44 | 65 | 5.0 | 23.5 | 6.0 | 0.5 |

TABLE IV

Sulfation/Sulfonation of TOFA (varieties of Examples 1 and 2)

| Example | % Sulfonated | % N.V. | pH | Brookfield Viscosity @ 25° C. cps |
|---|---|---|---|---|
| 45 | 5.1 | 50.8 | 8.7 | 3,600 |
| 46 | 5.6 | 50.5 | 9.0 | 2,500 |

TABLE IV-continued

Sulfation/Sulfonation of TOFA
(varieties of Examples 1 and 2)

| Example | % N.V. | pH | Brookfield Viscosity @ 25° C. cps |
|---|---|---|---|
| 47 | 5.8 | 51.8 | 8.6 | 5,250 |

% Sulfonation

| Example | % N.V. | pH | Brookfield Viscosity @ 25° C. cps |
|---|---|---|---|
| 48 | 4.0 | 50.2 | 8.8 | 19,300 |
| 49 | 5.4 | 52.5 | 8.7 | 2,950 |
| 50 | 6.8 | 48.9 | 8.9 | 900 |

Vehicle Composition:

| | |
|---|---|
| 45% | Vehicle (100% N.V. basis) |
| 5% | Polymer 8000 |
| 7% | Ammonia |
| 0.5% | Witco 3056A |
| 42.5% | Water |

EXAMPLE 51

The vehicle of Example 1 is used with a pigment to form an ink. Generally 10 to 50% by weight of the total ink composition comprises pigment. Any conventional pigment can be used. Representative of such pigments are carbon black, diarylide yellow, titanium dioxide, phthalocyanine blue (cyan) and calcium lithol red.

The binder vehicle and pigment are suspended together in water as a carrier. Generally, a viscosity adjuster as previously described is added in sufficient quantity to provide a printable viscosity in the printing ink composition of the invention, within a range of from about 10 to about 40 seconds.

Small amounts of other modifiers well known in the art may be used in formulating the inks. Examples of these are: microcrystalline and paraffin waxes, pigment extenders such as clays and pigment dispersing aids such as sodium hexametaphosphate or co-solvents like glycols and other high boiling solvent to regulate ink film drying rates.

In general, including all additives the ink composition of the invention will have solids contents ranging from 15 to about 80% by weight of the total composition; preferably 30 to 60% to insure good color density and printability.

Aqueous ink compositions advantageous for printing uncoated kraft paper may be prepared and based on a preferred vehicle of this invention. A press trial was conducted. Trial conditions were as follows:

Press: Four station, stack Flexo press.
Plate: Photopolymer.
Paper: 40 lb. bleached kraft.
Ink Roll: Smooth ceramic.
Pick Up Roll: Rubber.
Run Time: 5 hours.
Impressions: 33,400 (total)
Average Press Speed: 500 feet/minute (Normal production speed 395 FPM)

| | Ink Requirements | |
|---|---|---|
| Color | Printing Order | % Coverage* |
| Yellow | 1 | 95 |
| Red | 2 | 15 |
| Black | 3 | 15 |

*% coverage total 100% since job required color overprinting in certain coverage areas.

INK PERFORMANCE RELATIVE TO A KNOWN STANDARD

| | Vehicle of Example 1 |
|---|---|
| Hold-out (all colors) | Slightly better |
| Color strength (Black)* | Slightly more |
| Color strength (Red)** | Off shade |
| Color strength (Yellow)* | Equal |
| Dry rub, 50 cycles, 4 pounds (Avg. of single, double print areas) | Significantly better |
| Wet rub, same basis | Significantly better |

*All can be adjusted for more, less or equal intensity by slight adjustments to binder/pigment ratio or viscosity.
**Red ink had a "bluer" shade than standard due to leakage from black ink fountain into red.

Excellent print quality was achieved.
Ink formulas are provided below.

| | Yellow A | Red B | Black C |
|---|---|---|---|
| Vehicle of Example 1 | 28.00 | 34.00 | 43.00 |
| Polyglycol P-1200 (Dow) | 1.25 | 1.25 | 1.25 |
| 2 ethyl hexanol | 1.00 | 1.00 | 1.00 |
| Dow Corning H-10 Anti-Foam | 0.25 | 0.25 | 0.25 |
| Shamrock Wax 5-379-3N (Shamrock Co.) | 0.50 | 0.50 | 0.50 |
| Sun Chemical 274-1744 Yellow | 7.50 | — | — |
| Sun Chemical 274-9700 Yellow | 3.00 | — | — |
| Tipure Titanium Dioxide (National Lead Co.) | 20.25 | — | — |
| Hansa GG Red (American Hoescht) | — | 8.25 | — |
| Lithol Red 20-4210 (American Cyanamid) | — | 4.75 | — |
| 3040 White | — | 16.75 | — |
| Elftex 8 Carbon Black (Cabot Corp.) | 0.50 | — | 18.00 |
| Clay | 0.50 | — | — |
| Water | 37.75 | 33.25 | 35.50 |
| Viscosity, secs. #2 Zahn Cup | 21 | 35 | 40 |

The inks were prepared as follows:
(A) Yellow Ink:

Charge all ingredients except pigment and 10.75 parts of water to a suitable mixing tub equipped with a Hockmeyer (high speed dispersion) mixer. Charge pigment and mix about 15 minutes at medium to high speed. This mixture is then passed through a Morehouse stone mill twice to complete dispersion and the remaining 10.75 parts of water added and mixed with a Hockmeyer mixer.

(B) Red Ink:

Charge all ingredients except pigment, 19.0 parts of vehicle from Example 1, and 5.50 parts of water, and 16.75 parts of 3040 white to a suitable mixing tub equipped with a Hockmeyer mixer. Charge red pigments and mix at medium to high speed for 15 minutes. The mixture is then passed through a Morehouse stone mill twice to complete dispersion and the remaining formula components added and mixed with the Hockmeyer mixer.

(C) Black Ink:

Add all ingredients except 22.50 parts of vehicle from Example 1, 3.50 parts of water, and carbon black to suitable mixing tub equipped with a Hockmeyer (high speed dispersion) mixer. Add carbon black pigment and mix at medium to high speed for 15 minutes. Mixture is then passed through a stainless steel media shot mill, the remaining vehicle and water added and mixed with Hockmeyer mixer.

In preparing the inks of this invention, any conventional pigment dispersing equipment such as three roll mills and ball mills may be used.

In the composition of the invention, water is present as an essential ingredient, in sufficient proportion to act as a carrier for the vehicle and the inks of the invention, generally comprising from about 20% to 80% of the ink vehicle.

EXAMPLE 52

Newsprint Application:

An aqueous black newsprint using the vehicle of Example 1 ink method of packaging inks had the following composition:

| A. Grind Base | |
|---|---|
| Parts | |
| 15.0 | Elftex 8 Carbon Black (Cabot Corp.) |
| 15.0 | Vehicle of Example 1 |
| 31.0 | Water |
| 0.25 | Dow Corning H-10 Antifoam |
| 1.25 | Dow Polyglycol P-1200 |
| B. Let Down | |
| Parts | |
| 15.0 | Vehicle of Example 1 |
| 22.50 | Water |

Final ink is 30.0% solids at 22 seconds viscosity as measured on a #2 Zahn cup.

The ink is advantageous when printed on newsprint paper as shown in Table VI, below.

Analogous inks with Examples w, 3, 4, 7, 8, 11, 12, 14, 16, 17, 18, 19, 24, 27, 28, 29, 30, 31, 33, 45, 46 and 47 were also prepared. Adjustment for vehicle solids were made and different antifoams were used in certain cases, e.g., (Union Carbide SAG 471, Witco 3056A).

| Example | pH | Viscosity, #2 Zahn | Grind | Macbeth Color Density | (0–10) | Printability Handproof (0–10) |
|---|---|---|---|---|---|---|
| 1 | 8.4 | 22 seconds | Off | 1.41 | 10 | 10 |
| 2 | 8.5 | 22 seconds | Off | 1.25 | 10 | 10 |
| 3 | 9.0 | 24 seconds | Off | 1.3 | 10(+)* | 10 |
| 4 | 8.7 | 24 seconds | Off | 1.41 | 10 | 9 |
| 7 | 8.8 | 35 seconds | Off | 1.43 | 10 | 10 |
| 8 | 8.6 | 21 seconds (cut 15%) - heavy foaming. | | | | |
| 11 | 9.0 | 29 seconds | Off | 1.41 | 9 | 10 |
| 12 | | Poor pigment wetter - Grind base stiff paste. Letdown produced foaming. | | | | |
| 14 | 8.6 | Soft gel (24 hours) | Off | | Pigment reagglomeration. | |
| 16 | 8.8 | 24 seconds | Off | 1.40 | 9 | 10 |
| 17 | | Grind base OK. Letdown produced uncontrollable foam. | | | | |
| 18 | 9.0 | Gel (24 hrs.) | Off | | Pigment reagglomeration. | |
| 21 | 9.1 | Uncontrollable foam in grind base. | | | | |
| 24 | 8.8 | Gel (34 hrs.) | Off | | Pigment reagglomeration. | |
| 27 | 8.9 | 25 seconds | | | | |
| 28 | 8.9 | 16 seconds | | | | |
| 29 | 8.6 | 23 seconds | | | | |
| 30 | 8.8 | 17 seconds | | | | |
| 31 | 8.8 | 15 seconds | | | | |
| 33 | 8.8 | 16 seconds | | | | |
| 45 | — | 23 seconds | Off | 1.40 | 10 | 10 |
| 46 | — | 22 seconds | Off | 1.43 | 10 | 10 |
| 47 | — | 25 seconds | Off | 1.39 | 10(+)* | 10 |

*Footnote:
(+) indicates slightly superior performance.

What is claimed:

1. A printing ink vehicle, which comprises:
   (a) a binder consisting essentially of a sulfated or sulfonated organic water dispersible pigment binder;
   (b) from 1 to 10 percent by weight of the vehicle non-volatile portion of a viscosity adjusting agent;
   (c) a defoaming portion of a defoamer;
   (d) sufficient of a pH adjusting agent to obtain a pH of 5–12; and
   (e) water;
   wherein the binder comprises 50 to 100 percent of total vehicle solids said vehicle having a viscosity range of from about 150 to about 25,000 centipoise (Brookfield viscosity at 25° C.) and a pH within the range of 5–12.

2. The composition of claim 1 where (a) is a sulfated tall oil fatty acid containing 3 to 10 percent hydrolyzable sulfate.

3. The composition of claim 1 where (a) is a sulfonated tall oil fatty acid containing 3 to 10 percent sulfur as $SO_3$.

4. The composition of claim 1 where (a) is a sulfated castor oil containing 3 to 10 percent hydrolyzable sulfate.

5. The composition of claim 1 where (a) is an ethoxylated alkyl phenol sulfate.

6. The composition of claim 1 where (a) is a sulfated tall oil fatty acid containing 3 to 10 percent hydrolyzable sulfate and up to 35% rosin acids.

7. The composition of claim 1 where (a) is a sulfated oleic acid containing 3 to 10 percent hydrolyzable sulfate.

8. The composition of claim 1 where (a) is a sulfonated oleic acid containing 3 to 10 percent sulfur as $SO_3$.

9. The composition of claim 1 where (b) is a soya protein.

10. The composition of claim 1 where (b) is poly(vinyl pyrrolidone).

11. The composition of claim 1 where (b) is a poly(alkylene oxide).

12. The composition of claim 1 where (B) is poly-acrylate).

13. The composition of claim 1 where (b) is a dextrin, a waxy fluidity starch or a derivatized fluidity starch.

14. The composition of claim 1 where (b) is an alcohol soluble rosin-maleic resin.

15. The composition of claim 1 where (b) is a styrene-maleic anhydride resin.

16. The composition of claim 1 where (b) is a styrene-acrylic acid resin.

17. The composition of claim 1 where (b) is alginic alginate or a salt thereof.

18. The composition of claim 1 where (d) is ammonium hydroxide.

19. The composition of claim 1 where (b) is phosphoprotein.

20. An aqueous printing ink, which comprises:
(a) the vehicle of claim 1; and
(b) 10–50 percent by weight of a printing ink pigment; said ink having a viscosity within the range of from about 15 to about 80 seconds on a number 2 Zahn cup.

* * * * *

UNITED STATES PATENT AND TRADEMARK OFFICE
CERTIFICATE OF CORRECTION

PATENT NO. : 4,648,905
DATED : March 10, 1987
INVENTOR(S) : Michael C. Peck and Dennis M. Jacobi It is certified that error appears in the above—identified patent and that said Letters Patent is hereby corrected as shown below:

Cols. 5 & 6; Table I; Example 1; line 1; last column;

"3,80" should read -- 3,800 -- .

Col. 7; Table IV; - Delete Table IV.

Col. 8, Table IV-continued; Table IV-continued should be moved over under Col. 7 and the word "continued" deleted.

Also in Table IV, Col. 2; between the headings "Example" and "%N.V." insert the heading -- % Sulfated -- above the line.

UNITED STATES PATENT AND TRADEMARK OFFICE
CERTIFICATE OF CORRECTION

PATENT NO. : 4,648,905
DATED : March 10, 1987
INVENTOR(S) : Michael C. Peck and Dennis M. Jacobi It is certified that error appears in the above—identified patent and that said Letters Patent is hereby corrected as shown below:

Col. 9, Table IV-continued; between headings "Example" and "%N.V." insert the heading -- % Sulfated -- .

Signed and Sealed this

Twenty-seventh Day of October, 1987

Attest:

DONALD J. QUIGG

Attesting Officer

Commissioner of Patents and Trademarks